Sept. 13, 1960 K. FOWLER ET AL 2,952,389
LEAK DETECTING APPARATUS
Filed Nov. 3, 1958 3 Sheets-Sheet 1
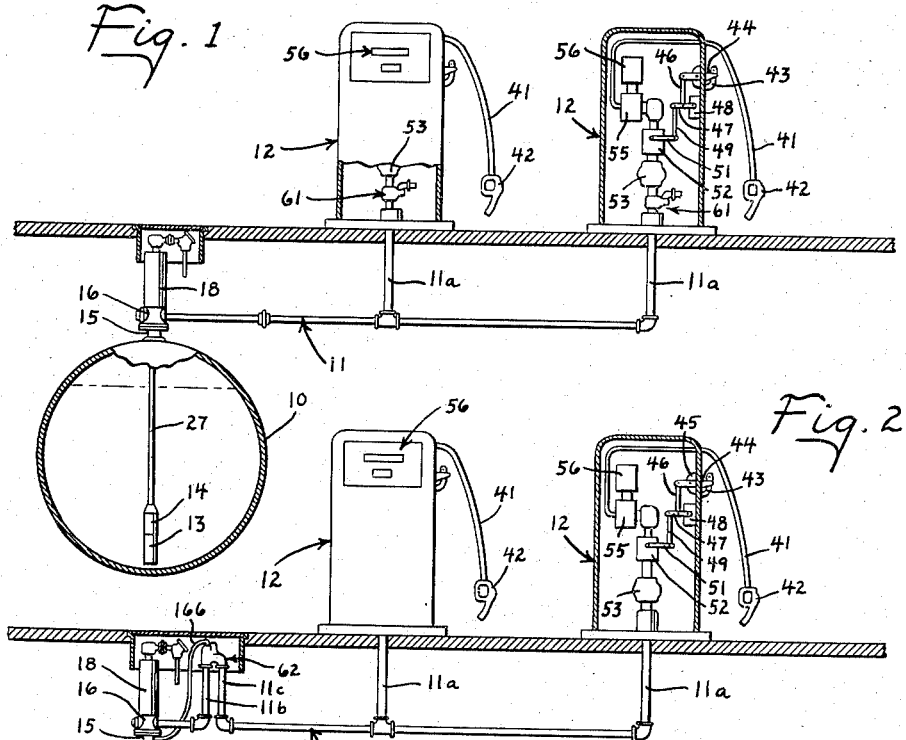
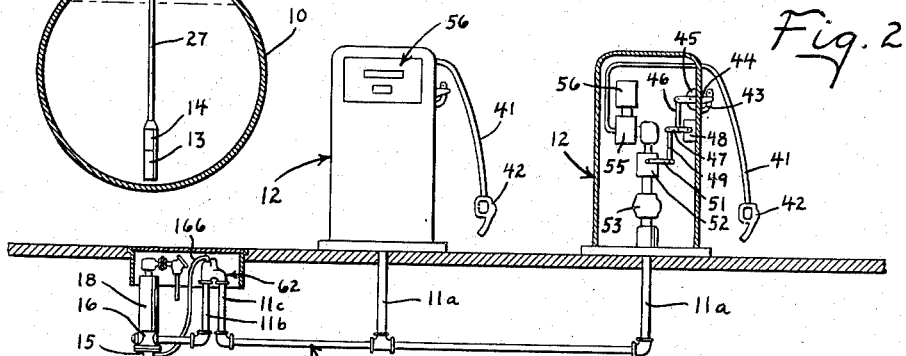
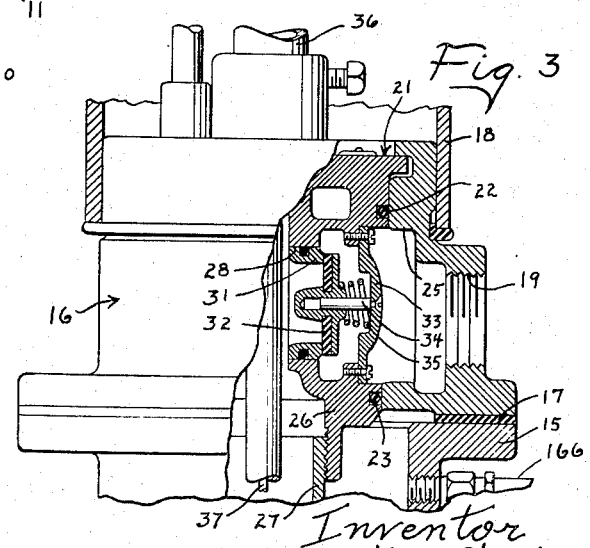
Inventor
Kirk Fowler
Marvin A. Brown
Elmer M. Deters
By McCanna, Morsbach & Pillote
Atty's

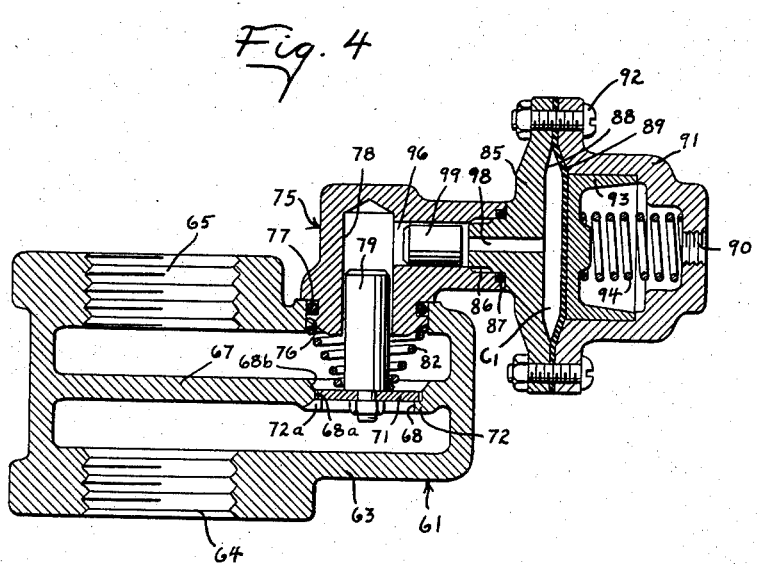
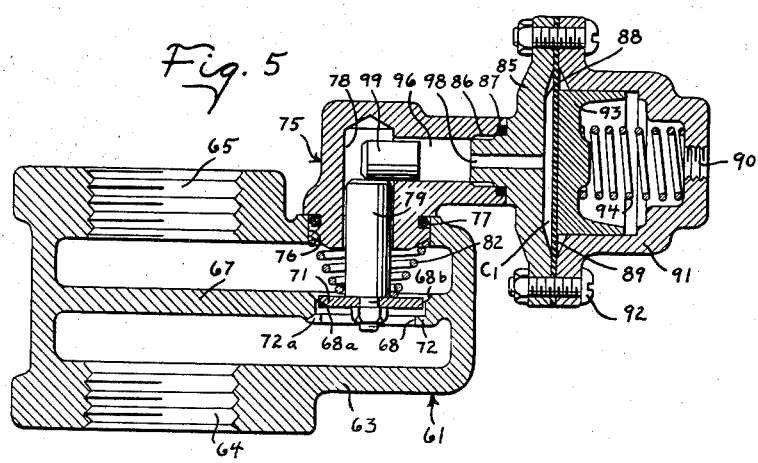
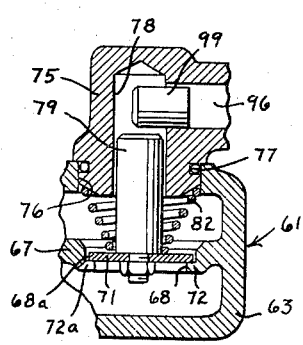

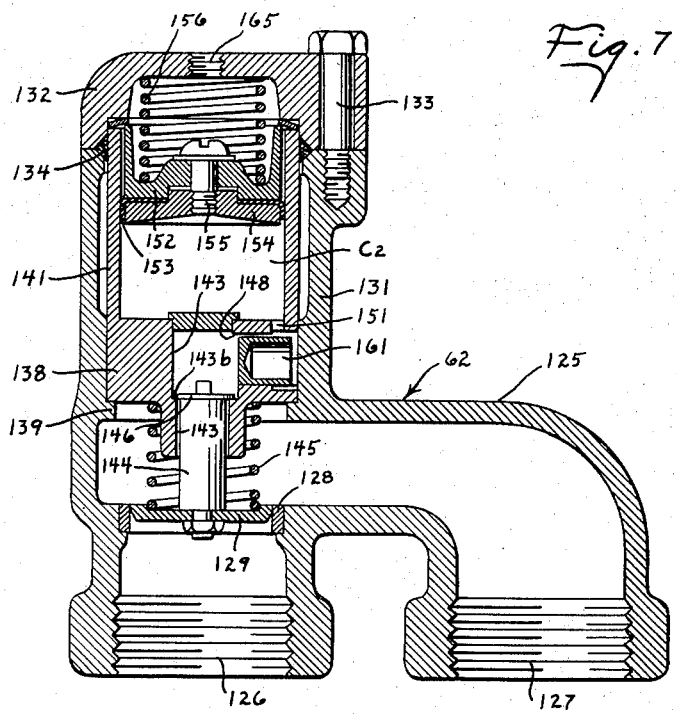
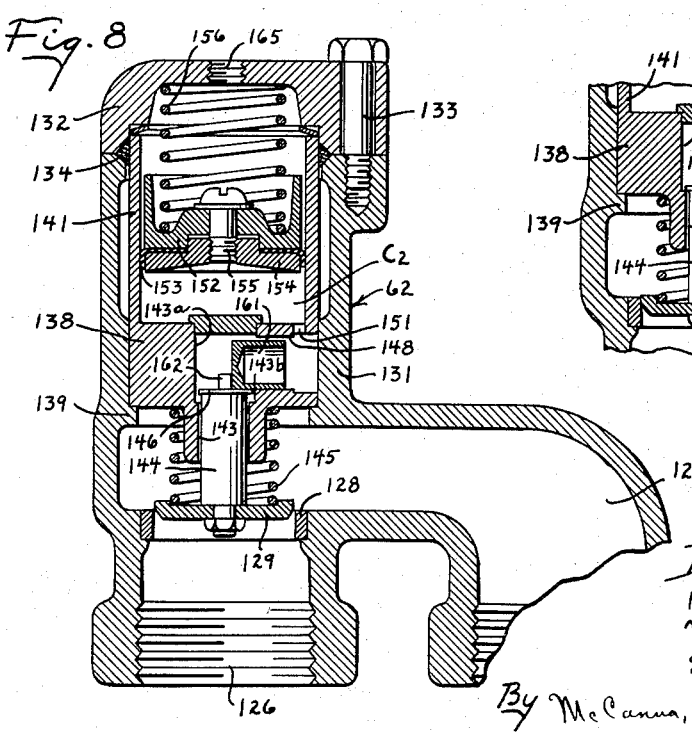
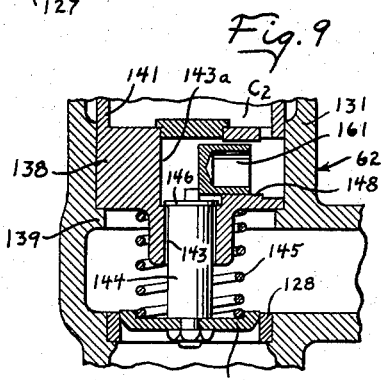

United States Patent Office 2,952,389
Patented Sept. 13, 1960

2,952,389
LEAK DETECTING APPARATUS
Kirk Fowler, Marvin A. Brown, and Elmer M. Deters, Davenport, Iowa, assignors to Red Jacket Manufacturing Co., Davenport, Iowa, a corporation of Iowa
Filed Nov. 3, 1958, Ser. No. 771,340
18 Claims. (Cl. 222—52)

This invention relates to novel and useful improvements in leak detecting apparatus and particularly to improvements in apparatus for detecting leaks in a line through which liquid is intermittently delivered under pressure.

In some gasoline service station installations, the pump is located at the underground tank and delivers gasoline under pressure through a supply line to one or more remote pedestals. In such a system, even a relatively small leak in the line would, if undetected for a period of time, produce a dangerous accumulation of gasoline in the ground around the leak. It is therefore necessary to detect even relatively small leaks in the supply line of such systems.

It has been determined that the rate of change in volume and pressure in the line due to thermal contraction of the liquid is low as compared to the rate of change of volume and pressure when a significant leak exists in the line. The present invention relates to improvements in apparatus for detecting a leak in such a supply line, as contrasted to thermal contraction of the liquid, by detecting when the rate of decrease of volume and pressure in the line exceeds a preselected rate.

An important object of this invention is to provide an apparatus for detecting the rate of change in pressure in a supply line, as an indication of a leak therein, which apparatus is of simple and compact construction and which is reliable in operation.

Another object of this invention is to provide an apparatus for detecting a leak in a line including a flow control valve and an improved mechanism for latching the valve in its closed position when the rate of decrease in the volume and pressure in the line exceeds a preselected rate, which locking means is so arranged as to be movable to its release position under the control of the operator at a remote dispensing outlet.

A more particular object of this invention is to provide a leak detecting apparatus wherein the flow control valve is automatically latched into its closed position when liquid leaks from the line and which flow control valve is unlatched and allowed to open in response to repeated opening and closing movement of the remote dispensing valve by the operator, after the pump is started.

These, together with various ancillary objects and advantages of this invention will be more readily appreciated as the same becomes better understood by reference to the following detailed description when taken in connection with the accompanying drawings wherein:

Figure 1 is a diagrammatic view of a service station installation having a leak detecting apparatus mounted at each of the dispensing pedestals;

Fig. 2 is a diagrammatic view of a service station installation having a leak detecting apparatus located in the supply linen in advance of the connection of the pedestals thereto;

Fig. 3 is an enlarged view of the discharge unit with parts broken away and shown in section to illustrate details of construction;

Fig. 4 is a vertical sectional view through one form of leak detecting apparatus and illustrating the same in its unlatched position;

Fig. 5 is a fragmentary vertical sectional view through the leak detecting apparatus of Fig. 4 illustrating the same in its latched position and when the delivery valve is open;

Fig. 6 is a fragmentary vertical sectional view through the leak detecting apparatus of Fig. 4 illustrating the same in its latched position when the delivery valve is closed;

Fig. 7 is a vertical sectional view through a modified form of leak detecting apparatus illustrating the same in its unlatched position and when the delivery valve is closed;

Fig. 8 is a vertical sectional view through the leak detecting apparatus of Fig. 7 illustrating the same in its latched position and when the delivery valve is open; and Fig. 9 is a fragmentary vertical sectional view of the leak detector of Fig. 7 illustrating the same in its latched position and when the delivery valve is closed.

As previously described, the present invention is adapted for detecting leaks in a supply line through which liquid is intermittently pumped under pressure and is herein shown applied to a gasoline service station installation. The service station installation shown in Figs. 1 and 2 are the same except for the positioning of the leak detecting apparatus therein and like numerals are utilized to designate the same parts in the different views. In particular, the service station installation includes an underground tank 10 for storing a quantity of gasoline, a supply line 11 for delivering gasoline from the tank to one or more pedestals 12, and a pump and motor assembly 14, herein shown of the submersible type, located at the tank for pumping gasoline from the tank through the supply line 11 to the pedestals. The outlet of the pump may be connected to the supply line in any desired manner and in the arrangement illustrated there is provided a flanged fitting 15 on the upper end of the tank, a discharge head 16 mounted on the fitting and sealed thereto by a gasket 17, and an extension 18 attached to the discharge head and extending upwardly therefrom. The discharge head 16 has a lateral outlet 19 connected to the supply line 11. An adapter unit or thimble 21 is disposed in the discharge head and sealed thereto at spaced points by O-rings 22 and 23 to define an annular chamber 25 in the discharge head. The thimble has a downwardly facing opening 26 which is connected to the delivery pipe 27 leading from the pump 13, and a lateral passage 28 is formed in the adapted unit to permit liquid to flow from the downwardly facing opening to the annular chamber 25 and the discharge head. A check valve is provided preventing return flow of liquid from the supply line and includes a member 31 defining an annular valve seat and a valve member 32 cooperable with the seat. The valve member 32 is mounted by a spider 33 and pin 34 on the adapter unit and is yieldably urged by a spring 35 to a position blocking flow through the port 28. As is apparent, the check valve is arranged to open and permit flow from the delivery pipe 27 through the port 28 and chamber 25 to the supply line 11, and to close to prevent return flow. A drop pipe 36 is connected to the adapter unit to permit withdrawal of the adapter unit and the pump and motor assembly from the tank. The power for the motor is supplied through conductors which extend through the adapter unit downwardly into the tank.

A valve mechanism is also provided at each of the pedestals 12 and is so arranged as to be closed when the pump is stopped to thereby entrap the liquid in the supply line 11 between the check valve 32 and the valve mechanism in the pedestals. As shown herein, the supply line 11 at each of the pedestals is connected to a delivery hose 41 having a conventional normally closed discharge valve on the outlet end thereof, which discharge valve is manually operable to its open position to permit dispensing of gasoline therefrom. The pedestal 12 also includes a conventional nozzle support 43 and a switch lever 44 extends over the nozzle support and is pivotally mounted by a bracket 45 on the pedestal. The switch lever is connected through a link 46 to the operating lever 47 on the pump control switch 48 and is also connected to a link 49 to the operating lever 51 of an interlock valve 52. The interlock valve is disposed in the supply line leading to the hose 41 and is normally closed, the interlock valve being opened in response to movement of the switch lever 44 to a position to close the pump control switch 48 and start the pump. A check valve 53 is also commonly provided in the supply line, either before or after the interlock valve, and a meter 55 controlling a register 56 is located in the supply line for measuring the quantity of liquid passing therethrough.

When the delivery valve 42 is closed to stop the dispensing of liquid, the check valve 53 at the pedestal also closes. The pump continues to operate and delivers liquid to the line until the pressure in the line builds up to maximum delivery pressure, that is full pump discharge pressure less any loss in head due to the difference in elevation between the pump and the line. The check valve at the tank then closes to prevent return flow and maintain pressure in the line. The discharge valve 42 on the hose is thereafter hung on the support 43 and operates the lever 44 to close the interlock valve and open the switch 48 to stop the pump. The supply line is thus effectively isolated from the remainder of the system when the pump is stopped, and provision is made for detecting a leak in the supply line between the valve at the tank and the valve at the pedestals. In the embodiments shown in Fig. 1, a leak detector 61 is provided in the supply line at each of the pedestals to cut off flow to the dispensing outlet at the respective pedestal in the presence of a leak in the line. This arrangement is particularly adapted for use in existing installations. In the embodiment shown in Fig. 2, the leak detector 62 is located in the supply line 11 ahead of the connection of the pedestals thereto so that a single leak detector will control the flow of liquid to all of the pumps connected to a particular supply line.

The leak detector 61 shown in Figs. 4–6 is adapted for use at the dispensing pedestals and includes a casing 63 having an inlet 64 and an outlet 65 disposed in vertical alignment so as to facilitate connection of the detector in the vertically disposed branch pipe 11a of the supply line. The casing 63 has a partition 67 intermediate the inlet and outlet 64 and 65 and a port 68 in the partition which is laterally offset from the point of connection of the branch pipe 11a thereto.

A valve member 71 is provided for controlling flow to the port 68 and as shown herein, the port 68 has a cylindrical wall portion 68a and the periphery of the valve member is spaced slightly from the cylindrical wall portion during movement of the valve member from the position shown in Fig. 4 to the position shown in Fig. 5. The upper portion of the partition is chamfered as indicated at 68b around the port to guide the valve member therein, and a flange 72 is positioned to underlie the valve member, when the latter is in its fully closed position shown in Fig. 4, to limit downward movement thereof. A valve stem guide block 75 is mounted in an opening 76 in the casing 63 and is sealed thereto by an O-ring 77. The guide block has a bore 78 therein aligned with the port 68 and which slidably receives the stem 79 attached to the valve member 71. A spring 82 is interposed between the guide block and the valve 71 to apply a light pressure to the valve and urge the same to its closed position shown in Fig. 4.

The valve 71 does not completely seal against the walls of the port 68, sufficient clearance being provided therebetween to permit a restricted flow of liquid thereby, of the order of one to two gallons per minute, when the valve member is closed. The flange 72 merely supports the valve member in its closed position and is provided with one or more notches 72a which permit the flow of liquid thereby. When the pump is stopped, pressure will be maintained in the supply line subject to thermal contraction of the liquid therein and also subject to any leakage from the line. If the pressure in the line at the inlet side of the valve 71 decreases, sufficient liquid will flow through notch 72a past the valve 71 from the discharge side thereof to maintain the pressure at the discharge side substantially equal to the pressure at the inlet side of the valve.

In accordance with the present invention, provision is made for latching the valve member in its closed position, when the rate of decrease in volume and pressure in the supply line exceeds the normal rate of thermal contraction of the liquid in the line with changes in ambient temperature. For this purpose, a small storage chamber is provided which communicates with the end of the valve stem guide passage 78 remote from the valve 71. In particular, the storage chamber includes a base 85 which is threadedly connected at 86 to the guide block 75 and is sealed thereto by an O-ring 87. The base has a concave face 88 and a diaphragm 89 overlies the base and is clamped thereto by a cover member 91 and fasteners 92. The cover member is cup-shaped in configuration and slidably supports a plunger 93 which engages the face of the diaphragm 89. A spring 94 is interposed between the plunger 93 and the cover to yieldably urge the diaphragm to a position to force the liquid out of the chamber C1 at the underside of the diaphragm. The spring 94 is selected to apply a pressure to the fluid in the chamber C1 which is slightly less than the normal delivery pressure in the line, that is the pressure the pump will maintain in the line when all delivery valves are open, so that the normal variations in pressure in the line while the pump is operating, as occur during dispensing, will not cause movement of the diaphragm. A vent 90 is provided in the cover member.

A plunger guide bore 96 is formed in the guide block 75 and intersects the valve stem guide passage 78 adjacent the upper end thereof. The chamber C1 communicates with the supply line through a passage 98 in the base 85, and through passages 96 and 78 in the guide block. The stem 79 has a relatively close fit in the guide passage 78. However, sufficient clearance is provided so that a restricted flow of liquid can pass therebetween into and out of the chamber C1. When the pump 13 is operating, fluid under pressure will flow through the guide passage 78 around the stem 79 and through the passages 96 and 98 into the chamber C1 to displace the diaphragm 89 to its extended position, shown in Fig. 4 and thereby store a charge of liquid in the chamber.

A locking plunger is slidably disposed in the guide bore 96 for movement into and out of a position overlying the end of the valve stem 79. The plunger has a close fit with the guide passage 96 to define a restricted flow passage therebetween. When the pump is stopped and the volume of liquid in the supply line 11 decreases, the spring 94 will tend to force fluid out of the chamber C1 through the passages 98, 96 and 78. When the volume of liquid and hence the pressure in the supply line drops relatively slowly due only to thermal contraction in the supply line, fluid from the chamber C1 will flow slowly past the plunger 99 into the supply line and, under these conditions, the fluid pressure differential between opposite ends of the plunger is not sufficient to move the plunger to its latched position shown in Fig. 5. The plunger 99 then remains in the position shown in Fig. 4. However, if the volume of liquid and hence the pressure in the supply line decreases rapidly, as occurs when there is a significant leak in the line, the spring 94 will cause a relatively rapid flow of liquid out of the chamber C1 into the line. The restricted flow area in the passage 96 around plunger 99 prevents such rapid flow past the plunger and produces a pressure unbalance on opposite ends of the plunger which moves the plunger to its latched position shown in Fig. 5. Movement of the plunger 99 out of its passage 96 is interrupted when the end of the plunger engages the cylindrical walls of the valve stem guide bore 78.

When the operator thereafter attempts to dispense liquid from the pedestal 12, it is apparent that full opening movement of the valve member 71 is prevented by engagement of the stem 79 with the locking plunger 99. As previously described, a limited flow of liquid, of the order of one or two gallons per minute, will flow past the valve member. However, this rate of flow is insufficient to permit normal dispensing.

It is a feature of the present invention that the flow control valve, after it has been latched in its closed position due to leakage from the line, can thereafter be unlatched to permit dispensing by manipulation of the dispensing valve 42 at the outlet. In order to delay the subsequent dispensing operation and there inconvenience the operator, the arrangement is such as to require repeated opening and closing of the dispensing valve at shortly spaced intervals to unlock the control valve.

When the pump 13 is started after a leak has occurred in the system, the pump delivers liquid to the inlet of the detector 61 and builds up the pressure at the underside of the valve 71. The valve 71 will move rapidly upwardly due to the fluid pressure unbalance thereon, until the stem 79 engages the locking plunger 99. The plunger prevents full opening movement of the valve, so as to permit only a limited flow of liquid past the valve. Moreover, when the stem engages the plunger, it locks the latter against movement to its retracted position.

The spring 82 is a light weight spring and applies a very small closing pressure on the valve so that the valve remains in its raised position shown in Fig. 5 until the fluid pressure at the upper side of the valve member 71 and the upper end of the stem 79 becomes substantially equal to the fluid pressure at the underside of the valve member. If the delivery valve is held open when the pump is operated, the pressure at the upper side of the valve member will remain very low, due to the limited rate of flow past the valve member when the latch is latched closed. Under these conditions, the valve member will remain in its raised position and prevent retraction of the locking plunger.

When the delivery valve is closed, the limited flow past the control valve will equalize the pressures on opposite sides thereof. However, only a restricted flow can pass between the valve stem and guide passage so that the pressure on the upper end of the stem will build up relatively slowly. This delays reseating of the control valve until the pressure at the upper end of the stem 79 reaches a value slightly below the pressure maintained in chamber C1 by the spring 94, at which time the weight of the control valve and the spring 82 are effective to reseat the valve. Continued flow past the stem will build up the pressure in the passage 78 above the stem until the pressure therein is slightly higher than in the chamber C1, at which time the liquid flows past plunger 99 into the chamber C1. However, since spring 94 maintains a pressure on the liquid therein only slightly lower than normal operating pressure in the line, the flow of liquid into the chamber C1 under these conditions is not sufficiently rapid to move the plunger to its released position.

In order to retract the plunger, the delivery valve 42 is opened before the chamber becomes filled. Opening of the delivery valve causes a rapid reduction in pressure at the outlet side of the valve which moves the control valve rapidly upwardly to the position shown in Fig. 5 abutting against the plunger 99. Since, as previously described, the stem has a relatively close fit with the guide passage 78, the stem will act as a piston and displace or pump a quantity of liquid above the stem toward the chamber C1. This rapid flow of liquid toward the chamber C1 will force the plunger a short distance toward its retracted position, until the stem engages the plunger and stops further movement. By adjusting the spacing between the end of the valve stem and the plunger, when the valve is in its lowered or closed position, the effective stroke of the valve stem can be controlled. The displacement of the valve stem, in moving from its closed position shown in Fig. 6 to a position engaging the plunger 99 as shown in Fig. 5, is preferably made appreciably less than the amount of liquid which must be displaced by the locking plunger as it moves from its latched position to its released position, so that the dispensing valve must be opened and closed by the operator a number of times before the locking plunger is worked back to its released position. If the dispensing valve 42 is held open for a time after the control valve stem engages the locking plunger, the fluid will flow out of chamber C1. However, the raised valve stem 79 will prevent movement of the locking plunger under these conditions. When the dispensing valve is reclosed, the control valve 71 remains in the position shown in Fig. 5 locking the plunger against movement until the pressure at opposite sides thereof and on the stem is substantially equalized, as previously described. Since the fluid pressure on the stem builds up slowly, the valve 71 moves slowly downwardly and does not end to draw the locking plunger outwardly to its latched position.

The leak detecting apparatus 62 shown in Figs. 7–9 is similar to that shown in Figs. 4–6 except that it is specifically adapted for use in the supply line ahead of the connection of the branch lines 11a leading to the pedestals. For this purpose, the casing 125 has a downwardly facing inlet 126 and a downwardly facing outlet 127 adapted to be connected to vertically extending portions 11b and 11c of the supply line 11 (see Fig. 2). An annular valve seat 128 is formed in the casing 125 intermediate the inlet and outlet and a valve member 129 cooperates with the seat to control flow through the supply line. The casing 125 also has an extension 131 on the upper side thereof which is closed by a cover 132. The cover is secured to the extension by fasteners 133 and sealed thereto by a packing 134. A guide block 138 is disposed within the extension 132 and is supported at its lower end by an inwardly extending flange 139. A sleeve 141 is formed integrally with the guide block and extends upwardly therefrom past the packing 134 so that the packing forms a seal between the sleeve 141, the cover 132 and the upper end of the extension 131.

The block 138 has a guide bore 143 formed therein for guidably receiving the stem 144 on the valve member 129. The upper end of the guide bore 143a is enlarged and defines a shoulder 143b. A spring 145 is interposed between the block 138 and the valve to urge the same to its closed position and a flange 146 is formed on the upper end of the stem 144 and arranged to engage the shoulder 143b to limit closing movement of the valve. As in the preceding embodiment, the stem 144 has a close fit with the guide bore 143 so as to define a restricted flow passage therebetween.

A lateral plunger guide bore 148 is formed in the block 138 and intersects the guide bore 143 adjacent the end thereof remote from the valve 129. The other end of the lateral guide bore 148 communicates through a small opening 151 with the chamber C2 in the sleeve 141. A piston including a head 152, a packing ring 153 and a packing retainer 154 are assembled together by a fastener 155 and slidably received in the sleeve to define an expansible chamber therein. A spring 156 is interposed between the cover 132 and the head 152 to yieldably urge the piston in a direction to force liquid out of the chamber C2. A locking plunger 161 is disposed in the lateral guide bore 148 for movement into and out of a position overlying the end of the stem 144, which plunger has a close running fit with the lateral guide bore so as to define a restricted flow passage therebetween. A pin 162 is provided on the end of the stem 144 to engage the locking plunger and limit outward movement of the same.

The chamber above the piston 152 is preferably vented to permit any leakage past the piston to escape. Since the leak detector 62 is conveniently located adjacent the pitless underground unit 69, the vent passage 165 in the cover may be connected through a conduit 166 (see Fig. 2) with the interior of the tank 10 above the liquid level therein. This is conveniently effected by connecting the other end of the conduit 166 to the fitting 15 at the top of the tank.

The operation of the above described leak detector 62 is substantially the same as that described for the leak detector 61 and further description is deemed unnecessary. However, it is to be noted that, when the leak detector is located at the pedestal as shown in Fig. 1, the control valve in its closed position must permit some flow thereby in order to transmit the loss in volume and pressure in the supply line to the leak detector. However, when the control valve is located very close to the tank, the control valve may, advantageously be arranged to completely shut off return flow of liquid when the control valve is in its closed position, and thus eliminate the necessity of a separate check valve such as 32 at the tank. With this arrangement, the control valve will detect a loss in volume and pressure in the supply line between the control valve and the valves at the pedestals, but will not detect a loss in pressure and volume in the line between the control valve and the tank.

We claim:

1. An automatic apparatus for detecting a leak in a line between an intermittently operated pump and a remote outlet comprising a casing means defining a flow passage having an inlet and an outlet and a port between said inlet and outlet, a flow-responsive valve member cooperable with said port and adapted to open in response to flow of liquid from said inlet to said outlet, a chamber communicating with said flow passage for receiving liquid therefrom when the pressure in said passage is above a preselected value and for delivering liquid to said passage when the pressure in the passage falls below a preselected value, and locking means operative in response to a preselected rate of flow of liquid out of said chamber for locking said valve member against movement to a fully open position.

2. The combination of claim 1 including a delivery valve at said outlet, and means operative in response to opening and closing of said delivery valve for actuating said valve means to release said valve member and to permit opening movement thereof.

3. An automatic apparatus for detecting a leak in a line between an intermittently operated pump and a remote outlet, a casing means defining a flow passage having an inlet and an outlet and a port between said inlet and outlet, a valve member cooperable with said port to control flow therethrough and movable in the direction of liquid flow from said inlet to said outlet from a position closing said port to a position opening said port, a chamber communicating with said flow passage for receiving liquid therefrom when the pressure in said flow passage is above a preselected value and for delivering liquid to the flow passage when the pressure therein is below said preselected value, locking means disposed in the path of flow of liquid out of said chamber and operative in response to a preselected rate of flow of liquid from said chamber to move from a release position to a locked position, and means on said valve member engageable with said locking means when the latter is in its locked position to lock the valve member against movement to a fully open position.

4. An automatic apparatus for detecting a leak in a line between an intermittently operated pump and a remote outlet, a casing means defining a flow passage having an inlet and an outlet and a port between said inlet and outlet, a valve member cooperable with said port to control flow therethrough and movable in the direction of liquid flow from said inlet to said outlet from a position closing said port to a position opening said port, a chamber communicating with said flow passage for receiving liquid therefrom when the pressure in the passage is above a preselected value and for delivering liquid thereto when the pressure in the passage is below a preselected value, a locking member disposed in the path of flow of liquid to and from said chamber and movable in one direction in response to a preselected rate of flow of liquid out of said chamber to effect locking of said valve member against opening movement and movable in the other direction to a release position in response to a preselected rate of flow of liquid into said chamber.

5. An apparatus for detecting a leak in a line between an intermittently operated pump and a remote outlet, a casing means defining a flow passage having an inlet and an outlet, said casing defining a port and a valve guide, a valve member cooperable with said port for controlling liquid flow therethrough and having a stem thereon disposed in said guide, said valve member being movable in the direction of liquid flow from said inlet to said outlet from a closed position to a position opening said port, a chamber for receiving a quantity of liquid, passage means communicating said chamber with said valve guide, a plunger disposed in said passage means and movable in one direction in response to a preselected rate of flow of liquid from said chamber and in the other direction in response to a preselected rate of flow of liquid to said chamber, said plunger being operative when moved in said one direction to engage said stem and lock the same against full opening of said valve member.

6. In a liquid pumping system including a source of liquid supply, a supply line extending from said source to a remote outlet, a pump at said source, means for selectively operating said pump to deliver liquid to said line, a valve at said outlet for selectively dispensing liquid therefrom, means for detecting a leak in said line comprising valve means in said line for controlling flow therethrough, a chamber communicating with said line for receiving liquid therefrom when said pump is operated and for delivering liquid to the line when the pump is stopped, locking means operative in response to a preselected rate of liquid flow out of said chamber to effect locking of said valve means against opening movement and operative in response to a preselected rate of flow into said chamber for releasing said valve means, and means operative when said pump is operating and responsive to repeated opening and closing of said outlet valve for intermittently increasing the rate of flow into said chamber to effect releasing of said locking means.

7. In a liquid pumping system including a source of liquid supply, a supply line extending from said source to a remote outlet, a pump at said source, means for selectively operating said pump to deliver liquid to said line, a valve at said outlet for selectively dispensing liquid therefrom, means for detecting a leak in said line comprising a casing in said line and having an inlet and an outlet, said casing defining a port and a valve guide passage, a valve member cooperable with said port and having a stem thereon disposed in said guide, said valve member when in its closed position being movable in the direction of liquid flow from the inlet to the outlet to an open position, a chamber adapted to receive a quantity of liquid, passage means communicating said chamber with said valve guide passage above the valve stem, a locking member disposed in said passage means and movable therein from a retracted position to an extended position overlying the end of said stem to lock the valve member against opening in response to a preselected rate of flow thereby from said chamber, said stem being spaced a short distance from said locking member when said valve member is in its closed position whereby said valve member will partially open to pass a restricted flow therepast when said locking member is in its extended position.

8. The combination of claim 7 wherein said valve member is operative, when said locking member is extended, to partially open and reclose each time the outlet valve is opened and closed whereby the valve stem produces a pumping action which intermittently increases the rate of flow of liquid to said chamber to aid in returning the locking member to its retracted position.

9. The combination of claim 8 wherein said chamber has a movable wall therein, and means yieldably urging said wall in a direction to displace the liquid from the chamber.

10. In a liquid supply system including a supply line having an outlet, a selectively operable pump for delivering liquid under pressure to said outlet, the combination therewith of valve means for controlling flow through said line adapted to open to permit flow from the pump to the remote outlet, means operative when the pump is stopped for detecting a leak in said line and for locking said valve means against opening movement, a delivery valve at said remote outlet, and means operative in response to opening and closing of said delivery valve while said pump is operating for actuating said detecting and locking means to release said valve means and permit opening movement thereof.

11. In a liquid supply system including a supply line having an outlet, a selectively operated pump for delivering liquid under pressure to said line, the combination therewith of a casing having an inlet and an outlet and a port between said inlet and said outlet, said casing defining a valve guide passage aligned with said port, a valve member cooperable with said port and having a stem thereon disposed in said guide passage, a chamber adapted to receive a quantity of liquid, passage means communicating said chamber with said valve guide passage above said valve stem, a fluid pressure responsive locking member disposed in said passage means and movable therein in a direction transverse to the direction of movement of the valve stem between a retracted position and an extended position overlying the end of said stem, means applying pressure to the liquid in the chamber to force the liquid out of the chamber through said passage means when the pressure in the line decreases below a preselected value, said pressure responsive locking means being movable to its extended position in response to rapid flow of liquid from the chamber caused by leakage from the line when the pump is stopped, said locking member when in its extended position engaging said stem to lock the valve member against full opening movement the next time the pump is operated to prevent full flow of liquid to the delivery valve.

12. The combination of claim 11 wherein said valve stem prevents retraction of said locking member when said stem is in engagement therewith.

13. The combination of claim 11 wherein the stem is spaced a short distance from the locking member when the valve is in its closed position, said valve and stem being movable from a closed position to a position wherein the stem engages the locking member in response to rapid decrease in fluid pressure at the outlet of said casing produced by opening of the delivery valve when the pump is operating, said stem displacing the liquid in the guide passage thereabove through said passage means into the chamber to move the locking member toward its retracted position, said valve stem preventing further retraction of said locking member when the stem moves into engagement therewith.

14. The combination of claim 13 wherein the volume of liquid displaced by the stem in moving from its closed position to a position engaging the locking member is less than the liquid displaced by the locking member moving between its extended and retracted positions, whereby the delivery valve must be repeatedly opened and closed in order to retract the locking member.

15. A flow control apparatus comprising casing means defining a flow passage having an inlet and an outlet, said casing means defining a port between said inlet and outlet and a valve stem guide passage aligned with said port at the outlet side thereof, a valve member cooperable with said port to control flow therethrough and movable in the direction of liquid flow from the inlet to the outlet from a closed to an open position, means yieldably urging the valve member to a closed position, a stem on said valve member slidably disposed in said stem guide passage and defining a restricted flow area therebetween, an expansible and contractible chamber, passage means communicating said chamber with said guide passage for passing liquid between said chamber and said guide passage, means for applying pressure on the fluid in the chamber, a flow actuated plunger in the passage means defining a restricted flow area therebetween and movable from a retracted position to an extended position in response to a preselected rate of flow from the chamber, and stop means on the stem engageable with the plunger when the latter is in its extended position to limit movement of the valve member to its open position.

16. The combination of claim 15 wherein said stop means on the stem when the valve member is closed is spaced a short distance from the plunger when the latter is in its extended position.

17. The combination of claim 15 wherein the valve member completely blocks flow through the port when in its closed position to prevent reduction in pressure at the outlet side of the valve member in response to a reduction in pressure at the inlet side of the valve.

18. The combination of claim 15 wherein the valve member and port define a restricted flow passage when the valve member is closed to reduce the pressure at the outlet side of the valve member in response to a reduction in pressure at the inlet side thereof.

References Cited in the file of this patent

UNITED STATES PATENTS 2,641,277    Booth _____ June 9, 1953